United States Patent
Kar et al.

(10) Patent No.: US 6,405,745 B1
(45) Date of Patent: Jun. 18, 2002

(54) ULTRA ACCURATE GAS INJECTION SYSTEM

(75) Inventors: Krishnendu Kar, Rochester; Robert Semidey, Fairport, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/532,220

(22) Filed: Mar. 22, 2000

(51) Int. Cl.[7] ............................. G05D 7/06; G01M 15/00
(52) U.S. Cl. ...................... 137/2; 137/486; 137/487.5; 137/624.11; 73/23.31; 702/100
(58) Field of Search .............................. 73/1.02, 1.03, 73/1.07, 23.2, 23.21, 23.31, 23.32; 137/2, 88, 486, 487.5, 624.11; 702/100

(56) References Cited

U.S. PATENT DOCUMENTS

| | | | |
|---|---|---|---|
| 3,672,388 A | * 6/1972 | Ringwall et al. | 137/88 |
| 4,379,402 A | * 4/1983 | Harman, III | 73/23.21 |
| 4,386,534 A | * 6/1983 | Englund et al. | 73/863.01 |
| 4,535,812 A | * 8/1985 | Miller | 137/624.11 |
| 5,129,418 A | * 7/1992 | Shimomura et al. | 137/487.5 |
| 5,450,436 A | * 9/1995 | Mizoguchi et al. | 372/59 |
| 5,469,731 A | * 11/1995 | Decker et al. | 73/23.31 |
| 5,621,166 A | * 4/1997 | Butler | 73/116 |
| 5,650,565 A | * 7/1997 | Nagy et al. | 73/199 |
| 5,669,419 A | * 9/1997 | Haas | 137/486 |
| 5,715,866 A | * 2/1998 | Granger | 137/624.11 |
| 5,744,695 A | * 4/1998 | Forbes | 73/1.35 |
| 5,753,185 A | * 5/1998 | Mathews et al. | 73/23.2 |
| 5,865,205 A | * 2/1999 | Wilmer | 137/487.5 |
| 6,119,710 A | * 9/2000 | Brown | 137/487.5 |
| 6,151,952 A | * 11/2000 | Mathews et al. | 73/23.31 |

* cited by examiner

Primary Examiner—Michael Powell Buiz
Assistant Examiner—Ramesh Krishnamurthy
(74) Attorney, Agent, or Firm—John VanOphem

(57) ABSTRACT

An ultra accurate gas injection system includes an input device for inputting setpoint data including a target flow rate for the flow of gas into the system. The gas flows through a mass flow controller at an actual flow rate. The mass flow controller issues a flow rate signal indicative of at least the actual flow rate and receives a flow control signal. The mass flow controller is configured to control the actual flow rate dependent at least in part upon the flow control signal. A programmable controller is electrically connected to the input device and the mass flow controller. The programmable controller receives the setpoint data from the input device and issues the flow control signal, the flow control signal being dependent at least in part upon the target flow rate contained within the setpoint data. The programmable controller repeatedly reads the flow rate signal and compares the actual flow rate with the target flow rate. The programmable controller adjusts the flow rate signal dependent at least in part upon the comparison of the actual flow rate with the target flow rate, and is configured to adjust the flow control signal such that the actual flow rate is substantially equal to the target flow rate. The programmable controller issues an output signal dependent at least in part upon the flow rate signal. An output device is electrically connected to the programmable controller and receives the output signal. The output device indicates the actual flow rate.

9 Claims, 3 Drawing Sheets

ULTRA ACCURATE GAS INJECTION SYSTEM

TECHNICAL FIELD

The present invention relates to the injection of a precise quantity of gas into a system.

BACKGROUND OF THE INVENTION

The processes used to place a predetermined mass of a gas into a system have remained virtually unchanged for decades. Generally, the mass of a gas within a system is determined to one of a gravimetric process, a partial pressure process, or an analytical process.

The gravimetric process involves, for example, weighing an empty cylinder with a known volume in which the gas or gas mixture is to be placed. Gas is pumped into the cylinder and, thereafter, is weighed a second time. The weight of the empty cylinder is subtracted from the weight of the partially full cylinder to determine the mass of the gas contained within the cylinder. This partial filling of the container and weighing of the container is repeated until the cylinder contains the desired mass of gas. The concentration of the gas is derived from the mass of gas within the container, volume of the container, and the density of the gas. The accuracy of the determination of the mass of gas contained within the cylinder is dependent upon the accuracy of the weighing apparatus used and the accuracy of each measurement of mass. Multiple measurements of the partially filled container must be made for even relatively simple and common concentrations of gas. Obviously, this is a crude and a relatively time consuming method by which to place a precise amount of gas within a closed system, such as a cylinder. The accuracy of the gravimetric process is generally limited to a maximum of five percent for a typical gas. However, when it is desired to fill a cylinder with a very low mass of gas, or a low concentration of one or more gases, this method provides an accuracy of only about ten percent.

The partial pressure method involves Daltons law, which states that the total pressure of a mixture of gases is equal to the sum of the pressures of all of the component gases taken separately. Daltons law, however, holds true only for ideal gases. Furthermore, where a low concentration of one or more component gases in a cylinder is desired, it is difficult to obtain a high degree of precision using the partial pressure method since the pressure of a low concentration of gas in a given volume is relatively small and can be obscured by a gas present in higher concentration which, therefore, exerts a greater pressure.

The analytical process involves analytically monitoring the proportion or concentration of a gas within a system. Although this method provides an accurate measure of the concentrations of gases within the volume of a system, the concentration of the gases is determined after a mixture has been produced. If one or more of the concentrations of the component gases are not within a predetermined tolerance range of the intended concentration, the entire mixture must either be scrapped, reprocessed, or sold as a higher tolerance, and less profitable, mixture. Furthermore, the analysis of the mixture is a time consuming and expensive process, during the completion of which the quality of the product or mixture is unknown. Until the analysis is completed, the mixture can not be sold but rather must be stored by the manufacturer.

Mechanical critical flow orifice (CFO) kits are used to measure a flow of gas. CFO kits operate on a sonic nozzle principle. Critical orifice flow is achieved when the velocity of the gas through a CFO reaches the speed of sound (i.e., becomes sonic), and remains constant. Variables in critical orifice flow measurement calculations are avoided only if the flow through the CFO remains in the critical flow or sonic range. The critical rate of flow for a CFO is proportional to the ratio of the absolute static pressure at the nozzle inlet and the ambient temperature. For a given nozzle, there is a minimum ratio of pressure to temperature below which the flow rate of the gas through the CFO is no longer accurately predicted by the ratio of pressure to temperature under which the CFO is being operated. Manipulation of the inlet pressure is far simpler and more cost effective than varying the ambient temperature under which the gas is flowing through a CFO. Thus, in order to maintain the ratio of pressure to temperature above the minimum level at which the flow rate of the gas through the CFO is predictable, the pressure at the inlet of the CFO must be above a certain level. Typically, CFOs require an inlet pressure of at least about 20 to 30 psi in order to ensure operation of the CFO is critical. Such a relatively high inlet pressure makes it difficult to deliver a very low mass of gas to an external system, or cylinder. Furthermore, precisely machined and manufactured CFOs operating under critical conditions achieve a maximum flow rate accuracy of only about 1%.

A practical application of the ability to place a very low concentration of gas into a system arises in the testing of automobile emissions control systems. Automobile emissions are said to be the single greatest source of pollution in numerous cities across the country. Automobiles emit hydrocarbons, nitrogen oxides, carbon monoxide and carbon dioxide as a result of the combustion process. Evaporative emissions occur through the evaporation of gasoline in the engine and fuel tank. The automobile emissions control systems of today are so advanced and efficient that evaporative emissions, rather than emissions from the combustion process, can account for a majority of the total hydrocarbon pollution on hot days.

The Clean Air Act of 1970 and the 1990 Clean Air Act set national goals of clean and healthy air for all and established responsibilities for industry to reduce emissions from vehicles and other pollution sources. The 1990 law further tightened the limits on automobile emissions and expanded Inspection and Maintenance (I/M) programs to allow for more stringent testing of emissions. Standards set by the 1990 law limited automobile emissions to 0.25 grams per mile (gpm) non-methane hydrocarbons and 0.4 gpm nitrogen oxides. The standards are predicted to be further reduced by half in the year 2004.

Manufacturers of automobiles and emissions systems have risen to the challenge of reducing automotive emissions by designing Low-Emission Vehicles (LEVs), Ultra-Low-Emission Vehicles (ULEV), Super-Ultra-Low-Emission Vehicles (SULEVs) and Zero-Emission Vehicles (ZEVs). In particular, LEVs reduce the emissions by up to seventy percent, ULEVs reduce emissions by up to eighty-five percent, and SULEVs reduce emissions by up to ninety-six percent. For example, the emission requirement for a ULEV is that it emit no more than 0.04 grams of hydrocarbon per mile. A SULEV must emit no more than 0.01 gpm of hydrocarbons. The emission levels of these vehicles have been reduced to a level which even the most sophisticated equipment in a laboratory environment can not accurately measure. Furthermore, the emission levels have been reduced to a level which would require the I/M programs to use similarly sophisticated equipment at numerous testing locations, thereby rendering the I/M programs impractical and cost prohibitive. Corroborative of this fact is that Americas car companies have signed agreements with three Department of Energy national laboratories to develop prototype instruments which are capable of providing reliable, accurate, and high-speed measurement of the trace emissions from such vehicles.

These prototype instruments will require testing and calibration, a process which is rendered susceptible to inconsistent results and inaccuracies due to the minute levels of pollutants the instruments must detect. Typically, testing of instruments used in measuring emissions are themselves tested and/or calibrated by creating a flow of a precision mixture of gases, thereby simulating the exhaust of an ULEV vehicle, or by filling a Sealed Housing for Evaporative Determination (SHED) with a precision mixture of gas. The instrument under test is used to measure the known and precise mixture of gas and the measured results are then compared with the known composition of the gas. An accuracy parameter for the instrument under test can then be determined.

A typical, ULEV currently in production emits no more than about 1 part per million (ppm) of hydrocarbon once the catalytic converter has reached its operating temperature. The above-described conventional methods of dispensing a given mass of gas are not capable of accurately and repeatably creating a gas having a concentration of 1 ppm of hydrocarbon, and therefore are not capable of simulating the exhaust gas concentration of an ULEV or SULEV. Furthermore, the conventional methods described above are not capable of delivering a mass of gas which is low enough to result in the gas having a very low concentration, which is hereby defined to be below about 20 ppm, in a reasonably small volume. More particularly, most emissions testing laboratories use a CFO to dispense propane at room temperature. As described above, the critical flow rate of a CFO is determined in part by the ratio of the absolute static pressure at the nozzle inlet to the ambient temperature. For a given nozzle, this ratio must be kept above a predetermined minimum to maintain the critical flow. Emissions testing is typically performed at room temperature. Therefore, the only remaining variable for a given nozzle is its inlet pressure. Because of the low concentrations of undesirable gases emitted from ULEVs and SULEVs, simulating the exhaust of such a vehicle or filling a SHED with a gas having such a low concentration requires a very low flow rate from the CFO. Thus, either a smaller nozzle must be used or the inlet pressure must be reduced. The use of a smaller diameter nozzle is limited by machining tolerances. The use of an inlet pressure that is low enough to achieve such a low concentration of a component gas results in the ratio of pressure to temperature falling below the minimum ratio at which the flow rate through the CFO is predicted by the sonic principle. Thus, a CFO based on the sonic principle is not capable of injecting into a system or sealed enclosure a mass of gas which is small enough such that the gas will have a very low concentration. Therefore, a CFO is of little, if any, practical use in creating a gas having a concentration low enough to be of practical application in the testing and/or calibration of equipment intended for the measurement of emissions from a ULEVs and SULEVs.

The code of federal regulations requires that emissions testing laboratories perform a quality check on the equipment used in testing emissions. This test allows for an error of plus or minus two-percent in the concentration of a gas injected into a constant volume system or SHED. When testing and/or calibrating for a gas concentration of, for example, 30 ppm in the SHED, a two-percent error constitutes an error of 0.6 ppm in the concentration of the gas injected into the constant volume system or SHED. This same 0.6 ppm error, when testing at the level of, for example, 1 ppm, constitutes sixty-percent of the 1 ppm test level.

Therefore, what is needed in the art is an apparatus and method which enable the precise injection of a very low concentration of at least one gas into a system.

Furthermore, what is needed in the art is an apparatus and method which enable the precise injection of at least one gas into a system at a constant, predictable, and very low rate of flow.

Moreover, what is needed in the art is an apparatus and method which enable the precise injection of at least one gas into a closed system in approximately the same concentration as the concentration of undesirable gases contained in the exhaust flow of an ULEV and SULEV, thereby allowing testing and/or calibration of instruments intended to measure such low concentrations of gases.

Even further, what is needed in the art is an apparatus and method which enable the creation of a precise flow of a particular gas having approximately the same concentration of that particular gas as does the exhaust of an ULEV and SULEV.

SUMMARY OF THE INVENTION

The present invention provides an ultra accurate gas injection system for injecting at a precise flow rate a flow of gas into an external system, thereby producing a precise concentration of the gas in the external system.

The invention comprises, in one form thereof, an input device for inputting setpoint data including a target flow rate for the flow of gas into the system. The gas flows through a mass flow controller at an actual flow rate. The mass flow controller issues a flow rate signal indicative of at least the actual flow rate and receives a flow control signal. The mass flow controller is configured to control the actual flow rate dependent at least in part upon the flow control signal. A programmable controller is electrically connected to the input device and the mass flow controller. The programmable controller receives the setpoint data from the input device and issues the flow control signal, the flow control signal being dependent at least in part upon the target flow rate contained within the setpoint data. The programmable controller repeatedly reads the flow rate signal and compares the actual flow rate with the target flow rate. The programmable controller adjusts the flow rate signal dependent at least in part upon the comparison of the actual flow rate with the target flow rate, and is configured to adjust the flow control signal such that the actual flow rate is substantially equal to the target flow rate. The programmable controller issues an output signal dependent at least in part upon the flow rate signal. An output device is electrically connected to the programmable controller and receives the output signal. The output device indicates the actual flow rate.

An advantage of the present invention is that precise quantities of a gas are injected into an external system at a controlled flow rate. Thus, a very low concentration of gas can be injected into the external system with great accuracy.

Another advantage of the present invention is a user can inject at least one gas at a very low and accurate rate of flow, thereby achieving a very low concentration of gas in the external system.

Yet another advantage of the present invention is the flow rate of the gas into the external system can be constant or can vary in a predetermined manner as set by the user.

A further advantage of the present invention is a user can enter a time period for the injection of the gas into the external system, and the injection of gas will automatically cease upon the expiration of that time period.

A still further advantage of the present invention is the user can select and adjust the rate of flow of the gas into the external system.

An even further advantage of the present invention is that it allows testing and calibration of an instrument capable of measuring very low concentrations of gas.

Lastly, an advantage of the present invention is that it allows the injection of multiple gases at a fixed or user defined variable flow rate into an external system.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DESCRIPTION OF THE PREFERRED EMBODIMENT

Figure 1:
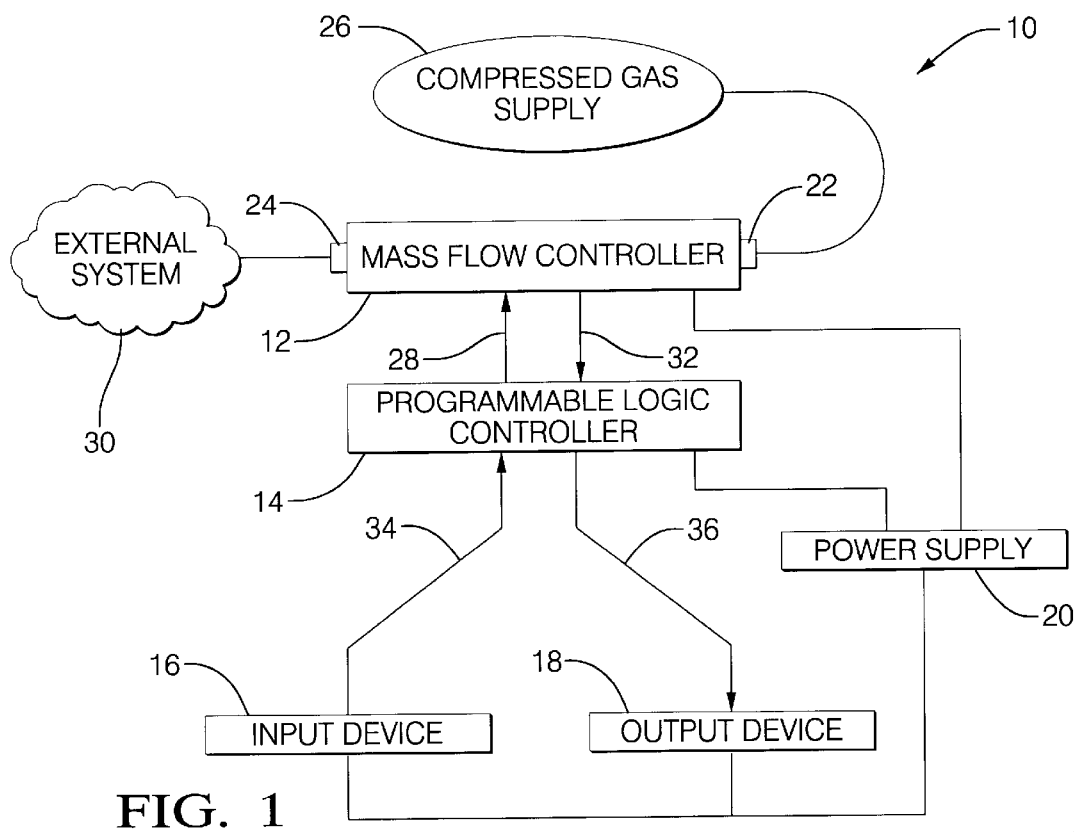
FIG. 1 is a block diagram of one embodiment of an ultra accurate gas injection system of the present invention.

Referring now to the drawings and particularly to FIG. 1, there is shown one embodiment of an ultra accurate gas injection system (UAGIS) 10 of the present invention. UAGIS 10 includes mass flow controller (MFC) 12, programmable logic controller (PLC) 14, input device 16, and output device 18, all of which are electrically connected to and powered by power supply 20.

Mass flow controller 12 includes gas inlet 22 and gas outlet 24. A supply of compressed gas 26 is connected to and flows into MFC 12 at gas inlet 22. The gas flows through MFC 12 and exits MFC 12 at gas outlet 24. MFC 12 receives flow control signal 28 issued by PLC 14, and is configured to control the rate of the flow of gas therethrough in response to flow control signal 28. Gas outlet 24 is connected to external, separate system 30. Gas exits gas outlet 24 at a flow rate which is controlled by MFC 12 based at least in part upon flow control signal 28, and then flows into external, separate system 30. MFC 12 issues flow rate signal 32 based upon the actual flow rate of the gas flowing therethrough.

PLC 14 receives setpoint data signal 34 which includes a desired rate of flow for the gas as entered by a user through input device 16. The desired flow rate may be constant or may vary with time. PLC 14 includes a number of internal memory locations or internal registers (not shown). PLC 14 stores the desired rate of flow in, for example, one of its registers or an external random access memory (not shown). Based at least in part upon the desired rate of flow information contained within setpoint data 34, PLC 14 issues flow control signal 28 to MFC 12. PLC 14 receives flow rate signal 32 from MFC 12 and is configured to compare flow rate signal 32 to the desired rate of flow contained in setpoint data signal 34. Based upon this comparison, PLC 14 adjusts flow control signal 28 to either increase or decrease the actual rate of gas flow through MFC 12. PLC 14 is configured to repeat the process of reading flow rate signal 32, comparing flow rate signal 32 to the desired rate of flow, and adjusting flow control signal 28. This process is repeated until the actual rate of flow is equal to the desired rate of flow. Once the actual rate of flow equals the desired rate of flow, PLC 14 continues to monitor flow rate signal 32 and adjust the flow control signal 28 as necessary. PLC 14 issues output signal 36, which is received by output device 18. Output signal 36 includes the actual flow rate of the gas through MFC 12.

Output device 18 is electrically connected to PLC 14 and receives output signal 36. Based on output signal 36, output device 18 indicates the actual flow rate of the gas through MFC 12. Output device 18 may be a printer, a series of LEDs, a cathode ray display tube, or other suitable output device. Output device 18 can be configured to display information in addition to the actual flow rate of the gas through MFC 12, such as, for example, the desired rate of flow, the difference between the actual rate of flow and the desired rate of flow, the amount of time for which gas has been flowing through MFC 12, and a countdown of time for which gas will be flowing through MFC 12.

Input device 16 is a keyboard, numeric keypad, mouse, or other input device through which a user can enter information and commands into PLC 14. Such inputs include, for example, the desired rate of flow of the gas into external system 30. Input device 16 is electrically connected to PLC 14. For applications where the desired rate of flow is fixed, or constant, input device 16 can be alternately configured as, for example, a read only memory device containing the desired rate of flow, which is read by PLC 14.

Figure 2:
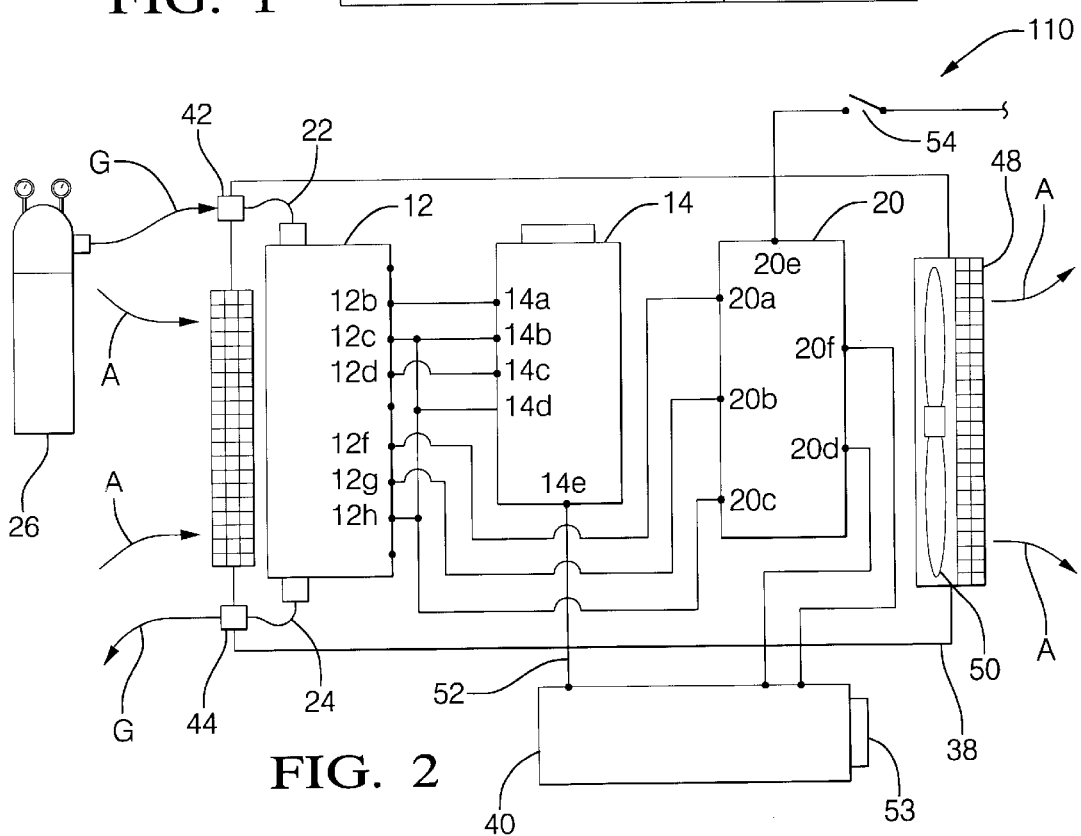
FIG. 2 is a schematic view of a second embodiment of the ultra accurate gas injection system of the present invention.

Referring now to FIG. 2, there is shown a second embodiment of the ultra accurate gas injection system of the present invention. The same reference numbers have been used to refer to the elements which are common to both embodiments of the ultra accurate gas injection system of the present invention. Ultra accurate gas injection system 110 includes MFC 12, PLC 14, power supply 20, case 38, and touch screen display 40. Each of MFC 12, PLC 14 and power supply 20 of ultra accurate gas injection system 110 are disposed within case 38. Each of MFC 12, PLC 14, and touch screen display 40 are electrically connected to and powered by power supply 20.

Case 38 includes case gas inlet 42 which is connected to gas inlet 22 of MFC 12, and case gas outlet 44 which is connected to gas outlet 24 of MFC 12. Case gas inlet 42 is connected to compressed gas supply 26, thereby connecting gas inlet 22 of MFC 12 to gas supply 26. Case 38 also includes a cool air inlet 46 and a hot air outlet 48. The cool air entering through cool air inlet 46 absorbs heat from MFC 12, PLC 14, power supply 20 and any other components disposed within case 38, and exits as hot air through hot air outlet 48. An electric cooling fan 50 is disposed adjacent to the hot air outlet 48, and acts to draw air into, through, and out of case 38 in the direction indicated by arrows A. Case 38 is of predetermined dimensions sufficient to house MFC 12, PLC 14 and power supply 20, and is constructed of a strong yet lightweight material, such as, for example, molded fiberglass or aluminum, thus rendering ultra accurate gas injection system 110 fully portable.

MFC 12 inputs 12c and 12h are electrically connected to power supply 20 output 20c, which ties those inputs to ground potential. MFC 12 input 12f is electrically connected to power supply 20 output 20a, which provides the appropriate negative bias to input 12f of MFC 12. MFC input 12g is electrically connected to power supply 20 output 20b, which provides the appropriate positive bias to input 12g of MFC 12. Flow control signal 28 is generated on output 14c of PLC 14, which is electrically connected to input 12d of MFC 12. MFC 12 reads flow control signal 28 from input 12d, and is configured to control the rate of the flow of gas therethrough dependent at least in part upon flow control signal 28. Gas exits gas outlet 24 of MFC 12, flows through case gas outlet 44 and into external system 30 at a flow rate which is controlled by MFC 12 dependent at least in part upon flow control signal 28. Gas flow is indicated by arrows G. MFC 12 is configured to determine the actual flow rate of the gas flowing therethrough, and generates flow rate signal 32 on output 12b based upon that actual flow rate.

MFC 12 is selected from any number of commercially available mass flow controllers, such as, for example, model no. 201-APASVCAA manufactured by Porter Instrument Company located in Hatfield, Pa. The selection of a particular mass flow controller is determined in part by the application requirements, such as, for example, the desired maximum and minimum flow rates. Ultra accurate gas injection system 110 provides a flow rate which is variable from 0–10 standard cubic feet per minute (scfm). However, by selecting a different mass flow controller having a different flow rate, ultra accurate gas injection system 110 can provide a flow rate which is variable from 0 to 1000 standard litres per minute (slpm), or above, and provides repeatable flow control to as low as 0.2 standard cubic centimeters per minute (sccm) when operated within the conditions specified by the manufacturer. More particularly, MFC 12 is sensitive to the pressure at gas inlet 22. A typical input pressure, and one which yielded the most desirable results, is about one-third of the rated input pressure for this particular MFC 12.

PLC 14 is electrically connected to touch screen display 40 through communications port 14e and communications cable 52, and receives setpoint data signal 34. PLC 14 is configured to read and store in an internal register the desired flow rate which is included within setpoint data signal 34. Dependent at least in part upon the desired flow rate, PLC 14 issues flow control signal 28 on output 14c. PLC 14 input 14a is electrically connected to output 12b of MFC 12 and reads flow rate signal 32 therefrom. PLC 14 is configured to compare flow rate signal 32 to the desired flow rate. Based upon this comparison, PLC 14 adjusts flow control signal 28 to either increase or decrease the actual flow rate of gas through MFC 12. PLC 14 is configured to repeat the process of reading flow rate signal 32, comparing flow rate signal 32 to the desired flow rate, and adjusting flow control signal 28 until the actual rate of flow is equal to the desired rate of flow. Once the actual flow rate equals the desired flow rate, PLC 14 continues to monitor flow rate signal 32 and adjust the flow control signal 28 as necessary. PLC 14 issues output signal 36 to communications port 14e to touch screen display 40 via communications cable 52. Output signal 36 includes the actual flow rate of the gas through MFC 12, and control data which controls the operation and display of touch screen 40. Output signal 36 can also include other parameters, such as, for example, an amount of time during which gas has been flowing through MFC 12, a remaining amount of time for which gas will be flowing through MFC 12, and the mass of gas which has flown through MFC 12.

PLC 14 includes a number of data registers, or memory locations, in which are stored various items of information such as, for example, the desired flow rate as read from setpoint data signal 34. The data registers of PLC 14 can store various other information, such as, for example, a desired time duration during which the injection of gas will occur, a start time and stop time for the injection of gas, a mass of gas to be injected, and interrupt codes. PLC 14 is selected from any number of commercially available programmable logic controllers, such as, for example, the Micrologix 1000 manufactured by Allen-Bradley Corporation. The Micrologix 1000 is analog-capable and has 16 bit resolution, although 8 bit resolution would be sufficient for use in the ultra accurate gas injection system of the present invention.

Touch screen display 40 is a liquid crystal touch screen display capable of displaying information and registering as input the touch of a user. Touch screen display 40 is electrically connected to outputs 20d and 20f of power supply 20. Outputs 20d and 20f supply the appropriate bias voltage for touch screen display 40. Touch screen display 40 is attached to or disposed within case 38 such that the screen of touch screen display 40 is visible and accessible to the user. PLC 14 is configured to send control data such that touch screen display 40 displays a series of menus, each of which contain soft keys that can be selected by a user pressing the screen in the area of the soft key. For example, PLC 14 is configured to send control data to touch screen 40 such that touch screen 40 displays a numeric keypad which enables a user to enter a desired flow rate and/or a desired injection time period by touching the soft keys of the numeric keypad displayed on touch screen 40. Touch screen 40 registers any touch, or input, and issues set point data signal 34 through communications cable 52 to PLC 14. Touch screen display 40 includes a data port 53 through which access to, for example, flow rate data and time data is provided. Data port 53 is an RS-232 port and provides the data in machine readable format.

Input 20e of power supply 20 is electrically connected to, for example, a conventional 120 Volt source of electrical power (not shown) through switch 54. Power supply 20 is configured to supply the appropriate D.C. voltages required by MFC 12, PLC 14, touch screen display 40 and any other components of ultra accurate gas injection system 110.

Figure 4:
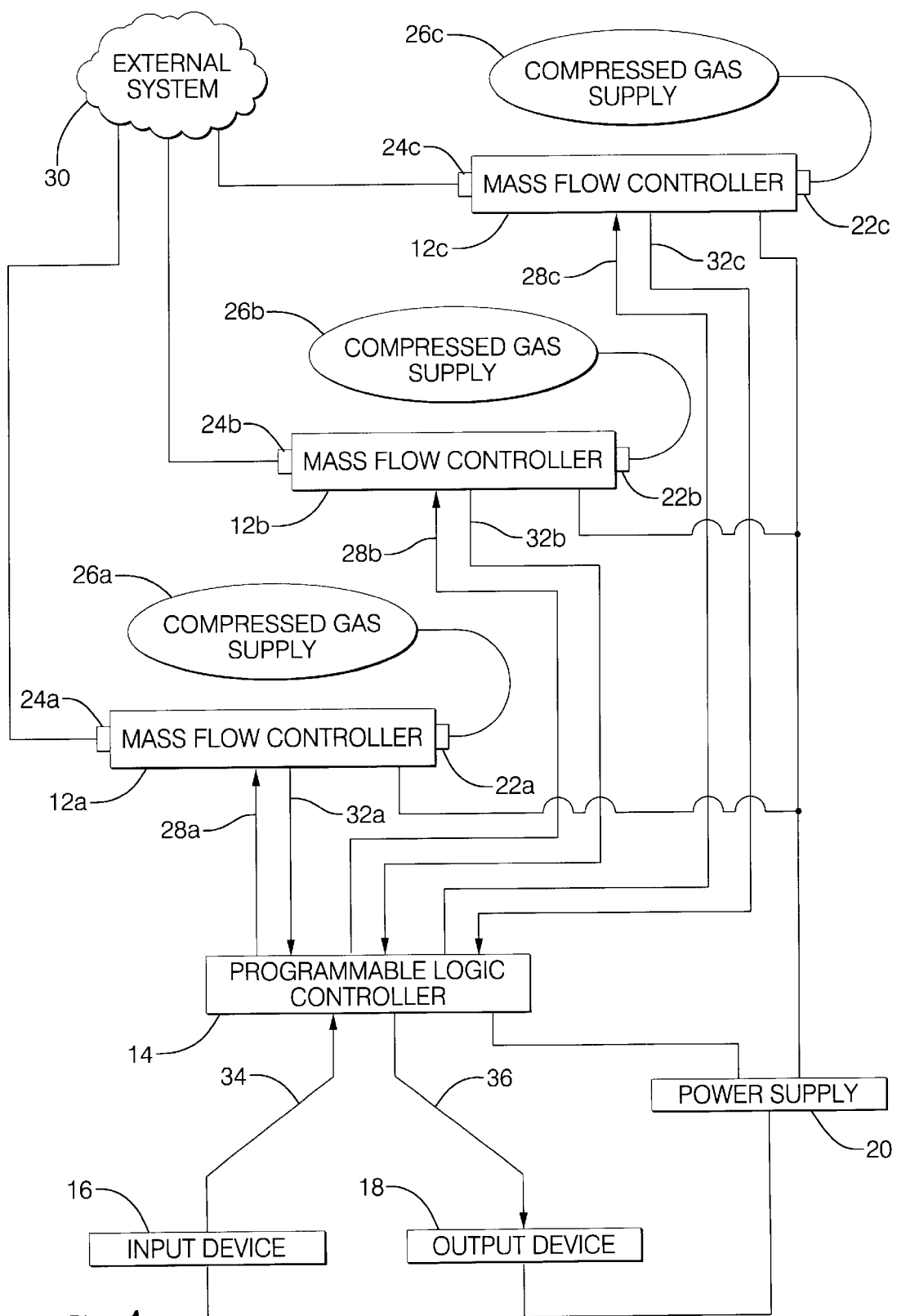
FIG. 4 is a block diagram of a third embodiment of an ultra accurate gas injection system of the present invention.

Referring now to FIG. 4, a third embodiment of the ultra accurate gas injection system 210 of the present invention is shown. UAGIS 210 operates in a substantially similar manner as UAGIS 10 and 110. However, UAGIS incorporates multiple mass flow controllers such as, for example, MFC 12a, 12b and 12c to inject gasses from compressed gas supplies 26a, 26b and 26c, respectively. Each of MFC 12a, 12b and 12c are connected to PLC 14. In conjunction with PLC 14, each of MFC 12a, 12b and 12c control the flow of gas therethrough and into external system 30. Thus, UAGIS 210 enables the injection of a plurality of gases into external system 30 with the same precision and advantages as UAGIS 10 and 110 as discussed herein.

In use, ultra accurate gas injection systems 10, 110 and 210 are turned on by activation of switch 54. PLC 14 is configured to undergo a period of warm up during which no operations are performed. After the warm up period, PLC 14 initializes all data registers and/or memory locations, and monitors communications port 14e for input data. When data, such as, for example, a desired flow rate and a time duration for injection of gas, is input via touch screen display 40, the data is sent to PLC 14 as setpoint data signal 34. Based upon setpoint data signal 34, PLC 14 establishes digital equivalents for the data entered. PLC 14 then issues flow control signal 28. As gas flows through MFC 12, flow rate signal 32 is issued thereby. PLC 14 reads flow rate signal 32 and compares the actual flow rate contained therein with the desired flow rate. PLC 14 then adjusts flow control signal 28 accordingly. The process of reading flow rate signal 32, comparing flow rate signal 32 with the desired flow rate, and adjusting flow control signal 28 is repeated until flow rate signal 32 is equal to the desired flow rate. PLC 14 continues to monitor the flow rate signal, perform the comparison thereof with the desired flow rate, and adjust flow control signal 28 until the desired time duration for the injection of gas has expired. At the expiration of the desired time period for injection, PLC 14 is configured to shut off the flow of gas through MFC 12 via flow control signal 28.

Figure 3:
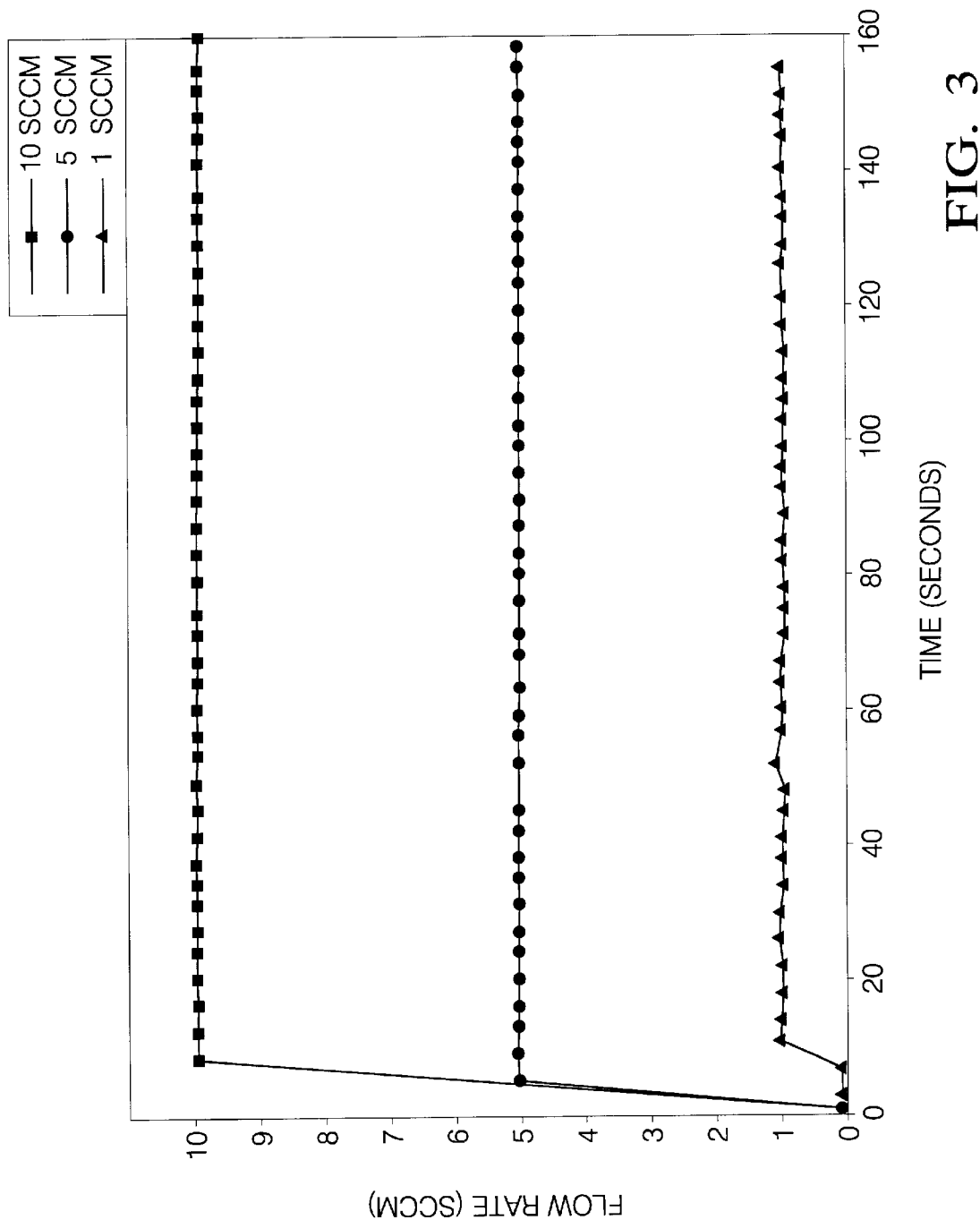
FIG. 3 is a graph illustrating the constant flow rate obtained with the ultra accurate gas injection system of the present invention.

Ultra accurate gas injection systems 10, 110 and 210 accurately achieve very low flow rates, such as, for example 1 sccm with an accuracy of 1 percent, through the use of an appropriate mass flow controller. Delivering such a low and accurate flow rate over a period of time permits the calculation of the mass of the delivered gas. The mass of the injected gas is given by the product of the injection flow rate, the injection time period, the density of the injected gas, and the concentration of the injected gas. The mass of the delivered gas is equal to the product of the volume of system 30, the density of the delivered gas, and the concentration of the delivered gas. Thus, one can derive that the concentration of the gas delivered into system 30 is equal to the product of the injection flow rate, the injection time period, and the concentration of the injected gas divided by the volume of system 30—all quantities which are known with substantial accuracy. Therefore, the concentration of the gas delivered into system 30 is also known with substantial accuracy. For example, if system 30 has a volume of 500 cubic feet, and it is desired to inject a 1 part per million (ppm) concentration of gas into system 30, the desired flow rate for a five minute injection period is calculated to be 2.83 sccm. As shown in FIG. 3, such a flow rate is easily and accurately obtained with ultra accurate gas injection systems 10 and 110. In fact, as shown in FIG. 3, an output flow rate of 1 sccm is accurately obtained with ultra accurate gas injection systems 10 and 110. At this low flow rate of 1 sccm, it is possible to accurately inject a concentration of gas as low as 0.56 ppm in a system volume as small as 100 cubic feet over a 5 minute period. Even lower concentrations can be injected into external system 30 if the 5 minute period is reduced.

In the embodiments shown, touch screen 40 is attached to or disposed within case 38. However, it is to be understood that touch screen display 40 can be otherwise disposed, such as, for example, remotely from ultra accurate gas injection system 110 so long as touch screen display 40 is electrically connected to PLC 14. In the embodiment shown, touch screen display 40 is described as a liquid crystal display. However, it is to be understood that touch screen display 40 may be alternately configured as, for example, a cathode ray tube or flat panel display having touch screen capability.

In the embodiments shown, power supply 20 is configured to be connected to a conventional source of electricity. However, it is to be understood that ultra accurate gas injection systems 10 and 110 can be alternatively configured to be electrically powered by a battery, solar power, or virtually any other source of electricity.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A method of injecting a precise concentration of at least one gas into an external system of known volume, said method comprising the steps of:

determining a desired concentration of each at least one gas to be contained within the external system;

selecting a desired flow rate at which the at least one gas is injected into the external system;

calculating a time period during which the at least one gas is injected into the external system, said time period determined at least in part by said desired concentration, said desired flow rate and the volume of the external system;

inputting said desired flow rate and said time period to a programmable controller, said programmable controller receiving a flow rate signal and issuing a flow control signal dependent at least in part upon said flow rate signal;

injecting at an actual flow rate the at least one gas into the external system;

controlling said actual flow rate with a mass flow controller, said mass flow controller issuing said flow rate signal and receiving said flow control signal, said mass flow controller adjusting said actual flow rate dependent at least in part upon said flow control signal;

adjusting said flow control signal such that said actual flow rate is substantially equal to said desired flow rate; and ceasing said injecting step upon the expiration of said time period.

2. The method of injecting of claim 1, wherein said ceasing step comprises adjusting said flow control signal.

3. The method of injecting of claim 1, wherein said inputting step comprises inputting a start time and a stop time, said start time corresponding to a time at which said injecting step is to commence and said stop time corresponding to a time at which said injecting step is to cease.

4. The method of injecting of claim 1, comprising the further step of indicating with an output device at least one of said actual flow rate of the gas, the amount of time during which said injecting step has been active, a period of time remaining during which said injecting step will be active, said start time, said stop time, said desired flow rate, and a mass of the gas contained within the external system.

5. A method of injecting into an external system a desired concentration of at least one gas, the external system having a known volume, the desired concentration of the injected gas in the external system being substantially equal to the concentration of the at least one gas contained within an exhaust of one of an ultra-low emissions vehicle and a super-ultra-low emissions vehicle, comprising the steps of:

determining the concentration of the at least one gas contained within the exhaust of the vehicle;

selecting a desired flow rate at which the at least one gas is injected into the external system;

calculating a time period during which the at least one gas is injected into the external system, said time period determined at least in part by said desired concentration, said desired flow rate and the volume of the external system;

inputting said desired flow rate and said time period to a programmable controller, said programmable controller receiving a flow rate signal and issuing a flow control signal dependent at least in part upon said flow rate signal;

injecting at an actual flow rate the at least one component gas into the external system;

controlling said actual flow rate with a mass flow controller, said mass flow controller issuing said flow rate signal and receiving said flow control signal, said mass flow controller adjusting said actual flow rate dependent at least in part upon said flow control signal;

adjusting said flow control signal such that said actual flow rate is substantially equal to said desired flow rate; and ceasing said injecting step upon the expiration of said time period.

6. The method of injecting of claim 5, wherein said ceasing step comprises adjusting said flow control signal.

7. The method of injecting of claim 5, wherein said inputting step comprises inputting a start time and a stop time, said start time corresponding to a time at which said injecting step is to commence and said stop time corresponding to a time at which said injecting step is to cease.

8. The method of injecting of claim 5, comprising the further step of indicating with an output device at least one of said actual flow rate of the gas, the amount of time during which said injecting step has been active, a period of time remaining during which said injecting step will be active, said start time, said stop time, said desired flow rate, and a mass of the gas contained within the external system.

9. A method of calibrating an instrument capable of measuring a very low concentration of at least one gas within a system, said method comprising the steps of:

determining a minimum concentration of gas the instrument is capable of measuring;

injecting the minimum concentration of gas into an external system of known volume, said injecting step comprising:

selecting a desired flow rate at which the gas is injected into the external system;

calculating a time period during which the at least one gas is injected into the external system, said time period determined at least in part by said minimum concentration, said desired flow rate and the volume of the external system;

inputting said desired flow rate and said time period to a programmable controller, said programmable controller receiving a flow rate signal and issuing a flow control signal dependent at least in part upon said flow rate signal;

injecting at an actual flow rate the at least one gas into the external system;

controlling said actual flow rate with a mass flow controller, said mass flow controller issuing said flow rate signal and receiving said flow control signal, said mass flow controller adjusting said actual flow rate dependent at least in part upon said flow control signal;

adjusting said flow control signal such that said actual flow rate is substantially equal to said desired flow rate; and ceasing said injecting step upon the expiration of said time period;

measuring the concentration of gas in the external system with the instrument;

comparing the measured concentration of gas with the concentration of the gas contained within the external system; and adjusting the instrument until the measured concentration of gas is substantially equal to the concentration of gas contained within the external system.

* * * * *